United States Patent [19]
Knebl et al.

[11] Patent Number: 5,458,894
[45] Date of Patent: Oct. 17, 1995

[54] APPARATUS AND METHOD FOR AUTOMATICALLY CONTROLLING THE SPEED OF A CANDY FORMING MACHINE

[75] Inventors: L. F. Knebl, Morristown, N.J.; Santiago Echeverry, Cali, Colombia

[73] Assignee: Warner-Lambert Company, Morris Plains, N.J.

[21] Appl. No.: 181,685

[22] Filed: Jan. 14, 1994

[51] Int. Cl.[6] ............................... A23G 1/00; A23G 7/00
[52] U.S. Cl. ..................... 426/231; 99/493; 425/140; 425/141; 425/145; 425/363; 426/660
[58] Field of Search ..................... 426/231, 517, 426/518, 660; 425/140, 141, 142, 145, 363; 99/493, 484

[56] References Cited

U.S. PATENT DOCUMENTS 4,468,185  8/1984  Jansen ........................... 425/141
5,156,867  10/1992  Leuthold et al. ............... 426/231

Primary Examiner—George Yeung
Attorney, Agent, or Firm—Charles W. Almer, III

[57] ABSTRACT

An apparatus and method including controls for automatically controlling the operating speed of a candy forming machine to make candy pieces of the same size having uniform outer diameters. The candy forming machine itself includes a batch roller for rolling a batch of candy mass, a rope sizer for shaping and sizing the rolled candy mass into a candy rope, and a candy former for cutting and forming the candy rope into candy pieces. By monitoring the size of the candy mass in the batch roller, the machine automatically synchronizes both the speed of the rope sizer and the speed of the candy former to the rate at which candy is introduced into the batch roller. More specifically, the candy forming machine includes a mechanism for sensing a particular candy mass diameter in the batch roller and generating a corresponding signal to a speed control device. The speed control device is responsive to the respective signal generated by the sensing mechanism by either increasing, maintaining, or decreasing the speed of the candy former accordingly.

21 Claims, 4 Drawing Sheets

APPARATUS AND METHOD FOR AUTOMATICALLY CONTROLLING THE SPEED OF A CANDY FORMING MACHINE

FIELD OF THE INVENTION

The present invention pertains to an apparatus and method for use in an industrial bulk manufacturing process. More specifically, the present invention pertains to a device for automatically controlling the operational speed of a candy forming machine to make candy pieces of the same size having uniform outer diameters. The present invention is particularly, but not exclusively, useful for manufacturing center-filled candy pieces where uniformity in candy layer thickness of each candy piece is desired.

BACKGROUND OF THE INVENTION

The three fundamental steps of a high speed industrial candy forming process include, in sequence; 1) introducing a batch of candy mass into a candy forming machine and rolling the candy mass, 2) shaping and sizing the candy mass into a candy rope, and 3) cutting and forming the candy rope into candy pieces. These three steps are respectively accomplished by machine components known as the batch roller, rope sizer and candy former.

It is well known in the art that the most difficult task in a commercial candy formation process is achieving uniformly sized candy pieces. The size of each candy piece produced by the candy former is directly dependent on the outer diameter of the respective segment of the candy rope from which the candy piece is cut. For example, a candy piece cut from a segment of the candy rope having a large diameter results in a large sized candy piece and a candy piece cut from a segment of the candy rope having a small diameter results in a small sized candy piece. Therefore, to achieve uniformly sized candy pieces, the diameter of the candy rope from which the candy pieces are cut must be uniform throughout the cutting process.

Manufacturing a candy rope with a uniform outer diameter is often difficult. Even more difficult is maintaining a uniform candy rope diameter when candy is formed with an outside layer of one type of candy and a center of a second type of candy. The second type of candy can be a liquid center, soft candy center, or hard candy center of a second flavor. In order to ensure that each candy piece has the same size and thickness of candy layers, the inner and outer diameter of the candy rope must be maintained uniform throughout the cutting process. This is accomplished, with respect to a candy forming machine, by synchronizing both the speed of the rope sizer and the speed of the candy former together with the rate at which candy is introduced into the batch roller.

As mentioned above, the size of each candy piece produced by the candy former is directly dependent on the outer diameter of the candy rope flowing from the rope sizer to the candy former. Furthermore, the diameter of the candy rope formed by the rope sizer is dependent in part on the force applied to the candy mass as it leaves the batch roller and enters the rope sizer. The force applied to the candy mass as it enters the rope sizer is established by the amount of candy mass in the batch roller and the angle at which the batch roller is set.

Presently, uniformity in the size of candy pieces in a candy forming process is accomplished by adjusting the angle of the batch roller in a candy forming machine. This is done either manually or automatically. For example, as the degree angle of the batch roller is increased, the gravitational force applied to the candy mass is increased resulting in a greater amount of candy mass flowing from the batch roller to the rope sizer. Consequently, a larger rope diameter is established resulting in larger sized candy pieces being produced in the candy former. This method of making uniformly sized candy pieces presents a critical problem since candy is not always introduced into the batch roller at a constant rate.

One method of achieving uniformity in rope diameter size is by adjusting the batch roller angle to correspond to a change in the amount of candy mass in the batch roller. However, continuously maintaining an effective batch roller angle in response to a change in the amount of candy mass in the batch roller is often difficult. Accordingly, an ineffectively low degree batch roller angle setting results in a small diameter candy rope and thus small sized candy pieces. Alternatively, an excessively high degree batch roller angle setting results in a large candy rope diameter and thus large sized candy pieces. Therefore, the candy pieces lack uniformity in size when the batch roller angle is not properly set to produce a uniformly sized diameter candy rope.

In the past, manufactures of candy forming machines have attempted to account for changes in candy rope diameter resulting from an ineffective batch roller angle by adjusting the speed of the rope sizer accordingly. For example, the speed of the rope sizer is decreased when the candy rope diameter becomes too small. However, when the speed of the rope sizer is manually decreased while the speed of the candy former remains unchanged, a stretching of the candy rope occurs between the rope sizer and the candy former. This stretching of the candy rope results in an uneven candy rope diameter. Additionally, if the speed of the rope sizer is decreased excessively, an overflow of candy mass occurs between the batch roller and rope sizer resulting in a large candy rope diameter. Consequently, adjusting the speed of the rope sizer to account for an ineffective batch roller angle often results in an uneven candy rope diameter which in turn creates unevenly sized candy pieces.

In light of the above, it is an object of the present invention to ensure the manufacture of uniformly sized candy pieces by making a candy rope with a uniform diameter throughout its length. It is another object of the present invention to provide a speed control device for automatically synchronizing both the speed of the rope sizer and the speed of the candy former together with the rate at which candy is introduced into the batch roller. It is yet another object of the present invention to provide a speed control device for a candy forming machine which allows for a constant batch roller angle setting and thus eliminates the need for manual or automatic adjustment of the batch roller angle.

SUMMARY OF THE INVENTION

The preferred embodiment of a candy forming machine in accordance with the present invention includes a batch roller for receiving and rolling a batch of candy mass. A rope sizer is attached to the batch roller and receives the candy mass from the batch roller for shaping and sizing the candy mass into a candy rope. Finally, a candy former receives the candy rope from the rope sizer and cuts the candy rope into pieces and forms the pieces into the finished candy product.

The preferred embodiment of the apparatus for automatically controlling the speed of the above mentioned candy forming machine includes a mechanism for sensing a change in the physical characteristics of the candy mass in the batch roller. More specifically, the sensing mechanism senses when one of three different candy mass diameter ranges exist in the batch roller; one diameter range corresponds to a small candy mass, another diameter range corresponds to a medium candy mass, and still another diameter range corresponds to a large candy mass. Finally, the sensing mechanism generates one of three different signals corresponding to one of the three diameter ranges sensed by the sensing mechanism.

The preferred embodiment of the sensing mechanism can utilize either an electro-optical or a mechanical system for generating the above mentioned signals. Preferably, an electro-optical system which utilizes photocells for generating signals is used. More specifically, the electro-optical system includes a first photocell emitter and a second photocell emitter which are both located on the batch roller opposite from a first photocell receptor and a second photocell receptor. With this structure, a first beam of light is established between the first emitter and first receptor, and a second beam of light is established between the second emitter and the second receptor.

In operation, both the first photocell receptor and first photocell emitter together sense when the first beam is in either an interrupted or uninterrupted state. Similarly, both the second photocell receptor and second photocell emitter together sense when the second beam is in either an interrupted or uninterrupted state. When both beams are sensed by their respective photocell pair as being in an uninterrupted state, a second signal is generated representing a small candy mass diameter range. Furthermore, when the first beam is sensed by its respective photocell pair as being in an interrupted state, and the second beam is sensed by its respective photocell pair as being in an uninterrupted state, a first signal is generated representing a nominal candy mass diameter range. Finally, when both beams are sensed by their respective photocell pair as being in an interrupted state, a third signal is generated representing a large candy mass diameter range.

The preferred embodiment of the apparatus for automatically controlling the speed of a candy forming machine also includes a speed control mechanism for establishing the operational speed of the candy former. The speed control mechanism establishes the operational speed of the candy former based upon the respective signal generated by the sensing mechanism. In particular, the speed control mechanism establishes one of three different speeds (low, nominal, high) of candy former operation corresponding to one of the three signals generated by the sensing mechanism. For example, the speed control mechanism sends a nominal signal to the candy former which establishes a nominal speed of candy former operation when a first signal is generated by the sensing mechanism. Additionally, the speed control mechanism sends a high signal to the candy former which increases the speed of the candy former between zero and thirty percent above an established nominal speed when a third signal is generated by the sensing mechanism. Finally, the speed control mechanism sends a low signal to the candy former which decreases the speed of the candy former between zero and thirty percent below an established nominal speed when a second signal is generated by the sensing mechanism. It should be noted that the speed of the candy former and the speed of the rope sizer are presynchronized so that a change in the speed of the candy former simultaneously changes the speed of the rope sizer.

The speed control mechanism includes three components; a receiving device, a programmable logic controller, and a drive device. The receiving device includes an input for receiving a control signal from the candy former and splitting the control signal into a low signal, a nominal signal, and a high signal. The programmable logic controller is electrically connected to the output of the receiving device and includes three inputs, each input for receiving one of three (low, nominal, and high) signals generated by the receiving device. Additionally, the programmable logic controller is electrically connected to the output of the sensing mechanism and includes one input for receiving a signal representing the interrupted or uninterrupted status of a first beam and one input for receiving a signal representing the interrupted or uninterrupted status of a second beam. As such, both programmable logic controller inputs together receive either a first signal, a second signal or a third signal from the sensing mechanism.

Finally, the output of the programmable logic controller is connected to a drive device. The drive device establishes a smooth transition in candy former speed due to changes in signals generated from the programmable logic controller.

The method of controlling the operating speed of a candy forming machine includes receiving the candy mass into a batch roller, sensing the amount of candy mass received by the batch roller, shaping and sizing the candy mass into a candy rope, cutting and forming the candy rope into candy pieces, and changing the operating speeds of the sizing and forming steps based on the particular candy mass characteristic sensed during the sensing step.

The novel features of this invention, as well as the invention itself, both as to its structure and its operation, will be best understood from the accompanying drawings, taken in conjunction with the accompanying description, in which similar reference characters refer to similar parts, and in which:

DESCRIPTION OF THE PREFERRED EMBODIMENT

Figure 1:
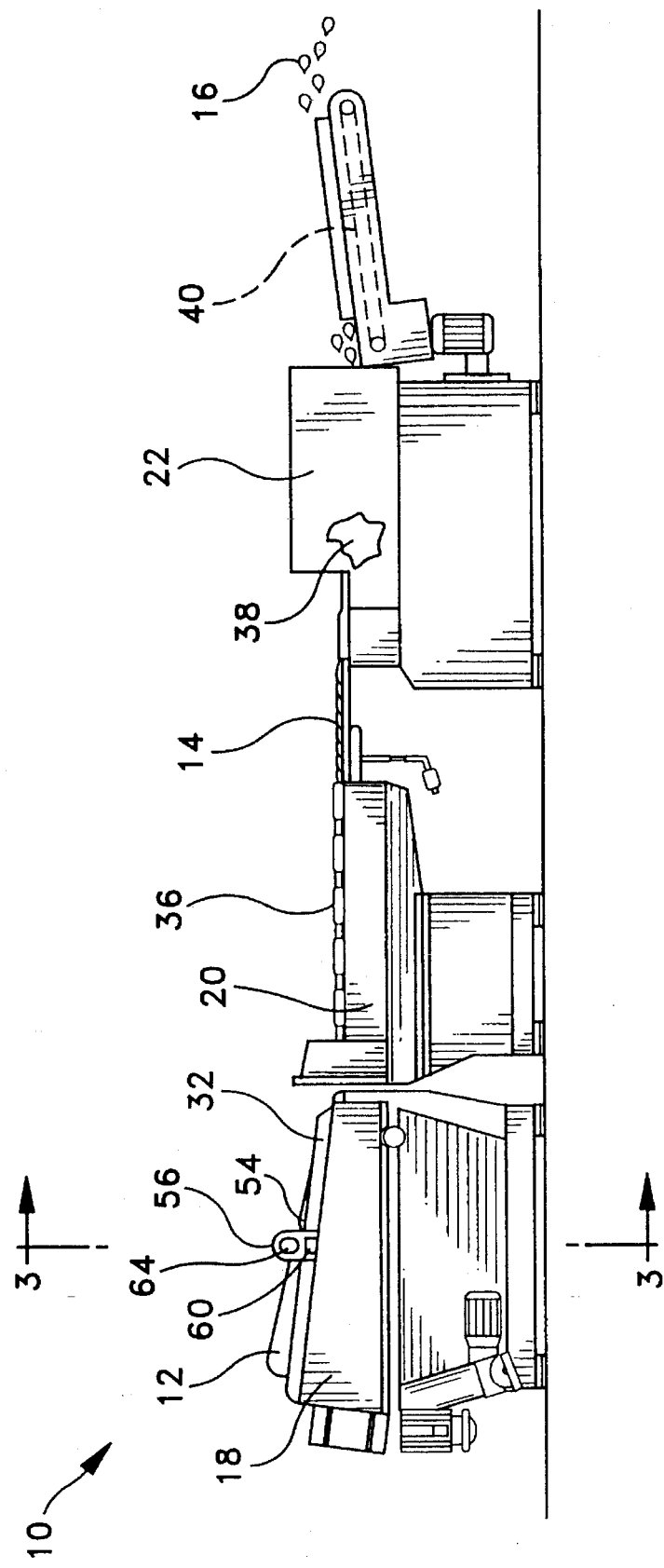
FIG. 1 is a side view of a candy forming machine showing the relationship between the batch roller, rope sizer and candy former.
Figure 2:
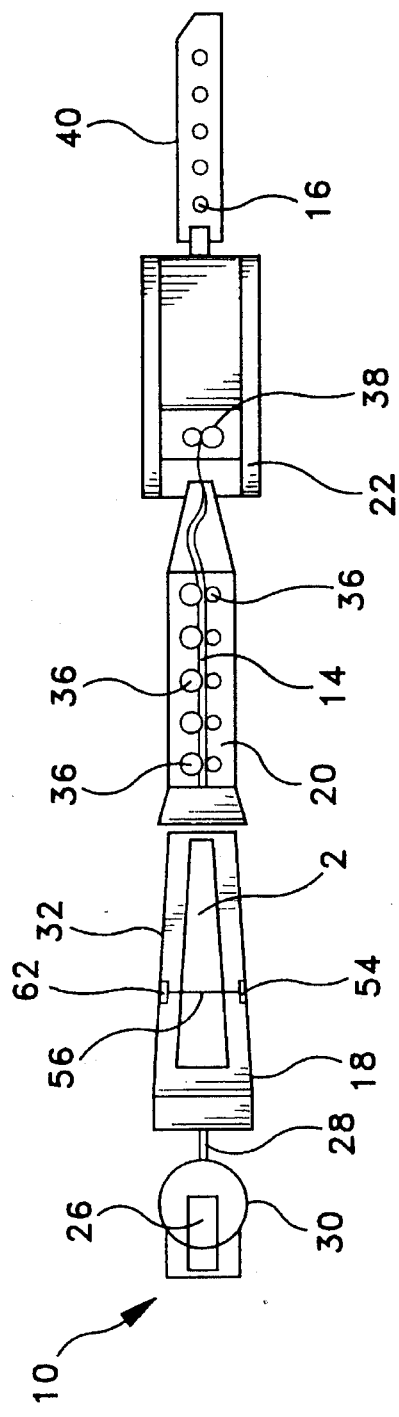
FIG. 2 is a top view of a candy forming machine showing the relationship between the batch roller, rope sizer and candy former.

Referring initially to both FIG. 1 and FIG. 2, a candy forming machine according to the present invention is shown and generally designated 10. The three fundamental steps of candy forming machine 10 include, in sequence; i) introducing a batch of candy mass 12 into candy forming machine 10 and rolling the candy mass 12, ii) shaping and sizing the candy mass 12 into a candy rope 14, and iii) cutting and forming the candy rope 14 into candy pieces 16. These three steps are respectively accomplished by machine 10 components known as the batch roller 18, rope sizer 20 and candy former 22.

The first component of the candy forming machine 10 is a batch roller 18. Candy mass 12 is introduced into batch roller 18 through a batch rolling feeder (not shown). If desired, a center-filled candy mixture 26 can be inserted into the center of candy mass 12 through filling tube 28 by operation of the pump 30. It should be noted that candy mixture 26 can be a liquid candy, soft candy, or hard candy of a different flavor than candy mass 12.

Figure 3:
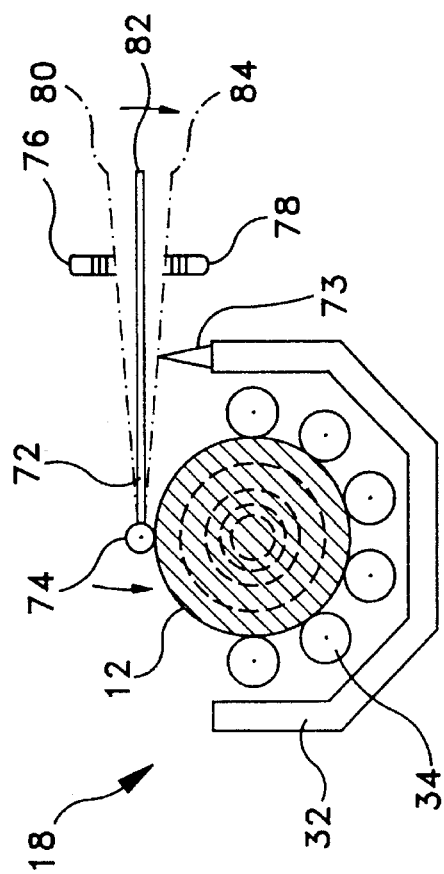
FIG. 3 is a cross section of the batch roller, as seen along line 3—3 of FIG. 1, showing a lever arm sensing device.

As illustrated in FIG. 3, several batch rollers 34 are contained within frame 32 of batch roller 18 and are arranged in a semi-circular fashion. Arranged in this manner, batch rollers 34 rotate candy mass 12 within batch roller 18 to form a rolled candy mass.

Referring back to both FIG. 1 and FIG. 2, the second component of the candy forming machine 10 consists of rope sizer 20. The purpose of rope sizer 20 is to shape and size candy rope 14 and direct it to the next component of the candy forming machine at a selected speed. Specifically, candy rope 14 is sized and shaped between each pair of rope sizing rollers 36 as shown in FIG. 2.

The final component of candy forming machine 10 consists of a candy former 22 having a speed adjustable motor 38 for controlling the operating speed of candy former 22. The candy former 22 receives candy rope 14 which then cuts and forms the candy rope 14 into candy pieces 16. Finally, candy pieces 16 leave candy forming machine 10 through conveyor 40.

Interconnected with the above components of the candy forming machine 10 is an automatic speed control apparatus generally designated 42. The particular relationship between the components in the automatic speed control apparatus 42 and the components of candy forming machine 10 is illustrated in FIG. 4 using dashed lines.

Figure 4:
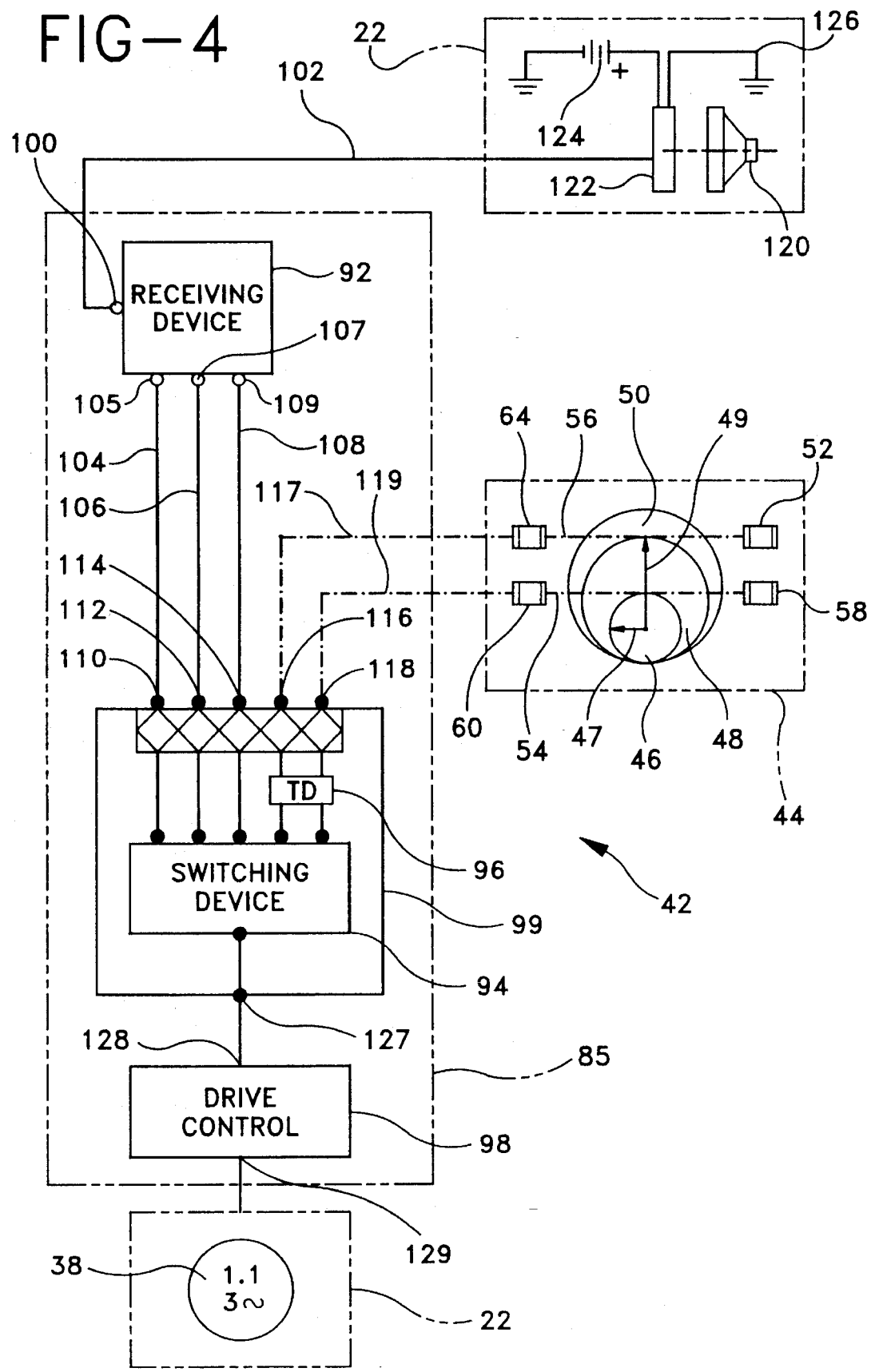
FIG. 4 is a diagram showing the relationship between components in the automatic speed control apparatus of a candy forming machine and showing an electro-optical sensing device.

As illustrated in FIG. 4, speed control apparatus 42 includes a mechanism 44 for sensing a change in the physical characteristics of candy mass 12 in batch roller 18. More specifically, sensing mechanism 44 senses one of three different candy mass diameter ranges existing in batch roller 18; one diameter range 46 corresponds to a small candy mass and includes candy mass diameters which are less than diameter 47, another diameter range 48 corresponds to a medium candy mass and includes candy mass diameters which are greater than diameter 47 but less than diameter 49, and yet another diameter range 50 corresponds to a large candy mass and includes candy mass diameters which are greater than diameter 49. The sensing mechanism 44 functions by generating a corresponding signal based on the particular candy mass diameter range sensed.

The sensing mechanism 44 can utilize either an electro-optical or mechanical system for generating a respective diameter range signal. Preferably, an electro-optical system as shown in FIG. 4 is used. Referring to FIG. 1, FIG. 2, and FIG. 4, the electro-optical system includes a first photocell emitter 58 and a second photocell emitter 62 which are both located on the frame 32 of the batch roller 18 opposite from a first photocell receptor 60 and a second photocell receptor 64. The first photocell emitter 58 and the second photocell emitter 62 respectively establish a first beam 54 and a second beam 56.

In operation, each photocell pair senses when its respective beam is in an interrupted or uninterrupted state. For example, a second signal which represents a small candy mass diameter range 46 in batch roller 18 is generated when both beams 54, 56 are in an uninterrupted state. Furthermore, a first signal which represents a nominal candy mass diameter range 48 in batch roller 18 is generated when first beam 54 is in an interrupted state and second beam 56 is in an uninterrupted state. Finally, a third signal which represents a large candy mass diameter range 50 in batch roller 18 is generated when both beams 54, 56 are in an interrupted state. The position of each beam 54, 56 with respect to one another can be any orientation that has the capability for allowing the first beam 54 to function in an interrupted state while the second beam 56 remains in an uninterrupted state.

FIG. 3 shows an alternate embodiment of sensing mechanism 44 utilizing a mechanical means of accomplishing the candy mass diameter sensing function. In this embodiment, the candy mass diameter range in batch roller 18 is sensed using a lever arm 72 positioned on pivot 73. More specifically, pivot 73 is attached to frame 32 of batch roller 18. Attached at one end of lever arm 72 is a rotatable ball 74 which moves upon the outer surface of rolled candy mass 12. The lever arm 72 is disposed between a first electrical contact 76 and a second electrical contact 78.

In operation, lever arm 72 is angled on pivot 73 such that it rests in position 80 touching first electrical contact 76 when a small candy mass diameter range 46 exists in the batch roller 18. In position 80, a second signal is generated. As candy mass 12 increases in diameter, lever arm 72 moves away from first electrical contact 76 and toward second electrical contact 78. When lever arm 72 is in position 82, a first signal is generated. As candy mass 12 continues to increase, lever arm 72 reaches position 84 touching second electrical contact 78. In position 84, a third signal is generated.

In yet another embodiment of sensing mechanism 44, the candy mass diameter function can be accomplished by generating similar signals based on the weight of the candy mass 12 in batch roller 18. Specifically, the weight of candy mass 12 can be measured using a scale 24 as shown in FIG. 1. By determining the weight of candy mass 12 in batch roller 18, an approximate diameter of candy mass 12 can be calculated. Consequently, signals could be generated corresponding to a predetermined range of candy mass weights.

In addition to sensing mechanism 44 described above, the automatic speed control apparatus 42 includes a speed control mechanism 85. Speed control mechanism 85 establishes the operational speed of the candy former 22 based on the particular signal (first, second, or third) generated by sensing mechanism 44.

The speed control mechanism 85 includes three components; a receiving device 92, a programmable logic controller 99, and a drive device 98. Structurally, receiving device 92 can be an electronic circuit board for splitting a control signal into three signals. In particular, receiving device 92 has a control signal input 100 and a low signal output 105, a nominal signal output 107, and a high signal output 109.

As indicated in FIG. 4, receiving device 92 receives a control signal 102 from candy former 22. Control signal 102 is a voltage level established by adjusting the knob 120 of a variable potentiometer resistance winding 122. The potentiometer resistance winding 122 is connected between a power source 124 and ground 126. The voltage of control signal 102 can be varied to establish a nominal operating speed of candy former 22. In particular, knob 120 can be adjusted to set the desired speed of candy former 22. After receiving device 92 receives control signal 102, it then generates a low signal 104, a nominal signal 106, and a high signal 108.

The above generated signals are received by a programmable logic controller 99 which is electrically connected to receiving device 92. Specifically, first signal input 110 of programmable logic controller 99 is connected to low signal output 105 of receiving device 92, second signal input 112 of programmable logic controller 99 is connected to nominal signal output 107 of receiving device 92, and third signal input 114 of programmable logic controller 99 is connected to high signal output 109 of receiving device 92.

Furthermore, programmable logic controller 99 is electrically connected to sensing mechanism 44. In particular, fourth signal input 116 of programmable logic controller 99 is connected to first beam output 117 and fifth signal input 118 of programmable logic controller 99 is connected to second beam output 119.

The programmable logic controller 99 can be a model SLC-500 manufactured by Allen Bradley. It should be noted that there are many substitute devices known in the art which will perform the function provided by the programmable logic controller.

A switching device 94 and a time delay device 96 are created using the programmable logic controller 99. Switching device 94 can be any device which has the capability of selectively connecting the three signals 104, 106, and 108 to input 128 of drive device 98. In addition, time delay device 96 can be any device which has the capability of delaying the respective signal generated by the sensing mechanism 44 for a programmed duration between five seconds and thirty seconds.

Figure 5:
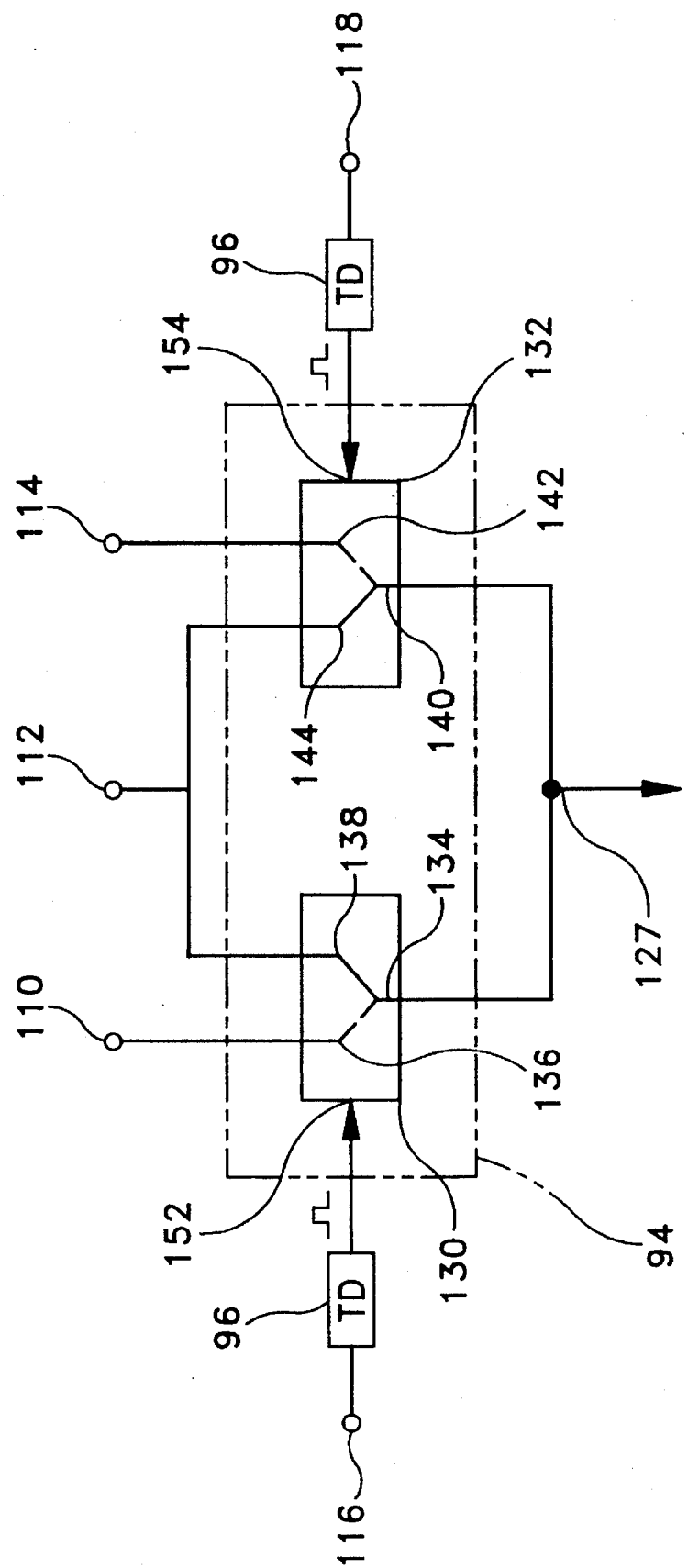
FIG. 5 is an electrical schematic representation of a switching device and a time delay device, both of which are created using a programmable logic controller.

Illustrated in more detail in FIG. 5, switching device 94 is created by programming a programmable logic controller 99 to create a first relay 130 and a second relay 132. First relay 130 has a common contact 134, switching contacts 136 and 138, and first relay triggering input 152. Similarly, second relay 132 has a common contact 140, switching contacts 142 and 144, and second relay triggering input 154. As shown in FIG. 5, fourth signal input 116 is connected to first relay triggering input 152 and fifth signal input 118 is connected to second relay triggering input 154. Electrically connected between fourth signal input 116 and first relay triggering input 152, and between fifth signal input 118 and second relay triggering input 154 is a time delay device 96. Connected as such, time delay device 96 delays the respective signal generated by the sensing mechanism 44 for a programmed duration between five seconds and thirty seconds before sending the signal to the switching device 94.

During nominal speed operation of candy forming machine 10, first relay 130 remains in its resting state connecting common contact 134 with switching contact 138. Similarly, second relay 132 connects common contact 140 with switching contact 144. When first signal is generated from sensing mechanism 44, the position of both relays 130 and 132 selects nominal signal 106. Accordingly, a nominal speed of the candy former 22 is established. However, when a third signal is generated by either embodiment of sensing mechanism 44, second relay 132 is energized connecting common contact 140 with switching contact 142. This relay position selects high signal 108 resulting in an increase in the speed of the candy former 22. Alternatively, when a second signal is generated from sensing mechanism 44, first relay 130 is energized connecting common contact 134 with switching contact 136. This relay position selects low signal 104 resulting in a decrease in the speed of the candy former 22. It should be noted that the speed of the candy former 22 and the speed of the rope sizer 20 are presynchronized so that a change in the speed of the candy former 22 simultaneously changes the speed of the rope sizer 20.

Referring again to FIG. 4, the input 128 of drive device 98 is electrically connected to the output 127 of programmable logic controller 99. The purpose of drive device 98 is to convert the respective signal received at its input 128 to a signal for controlling the speed of the candy former motor 38. In particular, drive device 98 functions by creating a smooth transition between changes in speed of the candy forming machine. The drive device 98 gradually ramps the voltage signal received on its input 128 and sends this resulting signal to the candy former motor 38. Accordingly, the speed of the candy forming motor 38 gradually increases or decreases based on the signal received on its input 128.

While the particular apparatus for automatically controlling the speed of a candy forming machine as herein shown and disclosed in detail is fully capable of obtaining the objects and providing the advantages herein before stated, it is to be understood that it is merely illustrative of the presently preferred embodiments of the invention and that no limitations are intended to the details of the construction or design herein shown other than as defined in the appended claims.

We claim:

1. An apparatus for automatically controlling the operational speed of a machine for forming a candy mass which comprises:

a batch roller for receiving and rolling said candy mass;

a rope sizer for shaping and sizing said rolled candy mass into a candy rope having a diameter, and wherein said rope sizer receives said rolled candy mass from said batch roller;

a candy former for forming and cutting said candy rope into candy pieces, and wherein said candy former receives said candy rope from said rope sizer;

means for sensing a change in the diameter of said candy mass in said batch roller; and a speed control device for controlling the operational speed of said rope sizer and the operational speed of said candy former, and wherein said speed control device is responsive to said diameter sensed by said sensing means.

2. An apparatus as recited in claim 1 wherein said sensing means includes means for establishing a first datum and means for establishing a second datum, said first datum means interacting with said second datum means to define a first diameter of said candy mass, a second diameter of said candy mass, and a third diameter of said candy mass.

3. An apparatus as cited in claim 2 wherein said sensing means generates a first signal when the diameter of said candy mass in said batch roller is said first diameter, wherein said sensing means generates a second signal when the diameter of said candy mass in said batch roller is said second diameter, and wherein said sensing means generates a third signal when the diameter of said candy mass in said batch roller is said third diameter.

4. An apparatus as recited in claim 3 wherein said speed control device is responsive to said sensing means by maintaining said operational speed of said candy former at a nominal speed in response to said generation of said first signal, decreasing said operational speed of said candy former below said nominal speed in response to said generation of said second signal, and increasing said operational speed of said candy former above said nominal speed in response to said generation of said third signal.

5. An apparatus as recited in claim 4 wherein said candy former comprises a means for generating a control signal for establishing said nominal speed of said candy former and said speed control device comprises a receiving device for receiving said control signal from said candy former.

6. An apparatus as recited in claim 5 wherein said receiving device includes a circuit for splitting said control signal into a low signal, a nominal signal, and a high signal.

7. An apparatus as recited in claim 6 wherein said candy former further comprises a motor, and said speed control device further comprises a drive device for driving said motor of said candy former.

8. An apparatus as recited in claim 7 wherein said speed control device further comprises a programmable logic controller for selectively connecting said low signal, said nominal signal, and said high signal with said drive device.

9. An apparatus as recited in claim 8 wherein said programmable logic controller connects said nominal signal with said drive device when said sensing means generates said first signal, said programmable logic controller connects said low signal and said nominal signal with said drive device when said sensing means generates said second signal, and said programmable logic controller connects said high signal and said nominal signal with said drive device when said sensing means generates said third signal.

10. An apparatus as recited in claim 9 wherein said drive device establishes a nominal speed of said candy former motor when said drive device receives said nominal signal, said drive device establishes a low speed of said candy former motor when said drive device receives said low signal and said nominal signal, said drive device establishes a high speed of said candy former motor when said drive device receives said high signal and said nominal signal.

11. An apparatus as recited in claim 10 wherein said low speed is in the range between zero percent and ten percent below said nominal speed of said candy former and said high speed is in the range between zero percent and thirty percent above said nominal speed of said candy former.

12. An apparatus as recited in claim 11 wherein said programmable logic controller comprises a switching device and a time delay circuit, said time delay circuit electrically connected between said sensing means and said switching device, for delaying one of said first signal, said second signal, or said third signal for a preselected duration.

13. An apparatus as recited in claim 12 wherein said preselected duration of said time delay circuit is between five seconds and thirty seconds.

14. An apparatus as recited in claim 10 wherein said operational speed of said candy former and said operational speed of said rope sizer are presynchronized.

15. An apparatus as recited in claim 2 wherein said first datum means is a first beam and said second datum means is a second beam.

16. An apparatus as recited in claim 15 wherein, said first beam and said second beam each operate in both an uninterrupted state and an interrupted state, said second characteristic of said candy mass being defined when both said first beam and said second beam are in said uninterrupted state, said first characteristic of said candy mass being defined when said first beam is in said interrupted state and said second beam is in said uninterrupted state, and said third characteristic of said candy mass being defined when both said first beam and said second beam are in said interrupted state.

17. An apparatus as recited in claim 16 wherein said first characteristic is a medium diameter candy mass, said second characteristic is a small diameter candy mass, and said third characteristic is a large diameter candy mass.

18. An apparatus as recited in claim 2 wherein said first datum means is a first predetermined weight and said second datum means is a second predetermined weight.

19. An apparatus as recited in claim 2 wherein said first datum means is a first electrical contact and said second datum means is a second electrical contact.

20. An apparatus as recited in claim 16 wherein said first beam of said sensing means is established by a first photocell emitter and said second beam of said sensing means is established by a second photocell emitter.

21. A method of automatically controlling the operational speed of an apparatus for forming a candy mass, which comprises the steps of:

receiving and rolling said candy mass;

receiving said candy mass from said rolling step, said candy mass moving at an operational speed and shaping and sizing said candy mass into a candy rope having a diameter;

receiving said candy rope from said sizing step and forming and cutting said candy rope into candy pieces;

sensing a change in the diameter of said candy mass during said rolling step; and controlling the operational speed of said sizing step and said forming step in response to said diameter sensed in said sensing step.

* * * * *